US007546122B1

(12) United States Patent
McGunnigle

(10) Patent No.: US 7,546,122 B1
(45) Date of Patent: Jun. 9, 2009

(54) METHOD AND APPARATUS FOR PROVIDING A WIRELESS INTEROFFICE FACILITY

(75) Inventor: John E. McGunnigle, W. Bridgewater, MA (US)

(73) Assignee: Dark Air, Inc., Waltham, MA (US)

( * ) Notice: Subject to any disclaimer, the term of this patent is extended or adjusted under 35 U.S.C. 154(b) by 134 days.

(21) Appl. No.: 09/848,048

(22) Filed: May 3, 2001

(51) Int. Cl.
*H04W 24/00* (2006.01)
(52) U.S. Cl. ............... 455/426.1; 455/426.2; 455/445; 455/443; 455/554.1; 455/554.2
(58) Field of Classification Search ............. 455/426.1, 455/426.2, 445, 443, 554.1, 554.2, 422.1
See application file for complete search history.

(56) References Cited

U.S. PATENT DOCUMENTS

| | | | | |
|---|---|---|---|---|
| 5,153,907 A | * | 10/1992 | Pugh et al. ................ | 379/143 |
| 5,590,396 A | * | 12/1996 | Henry .................... | 455/426.1 |
| 5,917,827 A | * | 6/1999 | Cantwell ................. | 370/466 |
| 6,169,910 B1 | * | 1/2001 | Tamil et al. ............. | 455/562.1 |
| 6,415,150 B1 | * | 7/2002 | Owens et al. ............ | 455/445 |
| 6,529,706 B1 | * | 3/2003 | Mitchell ................. | 455/12.1 |
| 6,633,743 B1 | * | 10/2003 | Berlinsky ............... | 455/11.1 |
| 2002/0197989 A1 | * | 12/2002 | Cruder et al. ............ | 455/426 |
| 2003/0076846 A1 | * | 4/2003 | Heinz et al. ............. | 370/404 |
| 2003/0194973 A1 | * | 10/2003 | Pasternak ............... | 455/77 |
| 2004/0005891 A1 | * | 1/2004 | Yu et al. ................. | 455/428 |
| 2005/0232193 A1 | * | 10/2005 | Jorgensen ............... | 370/329 |

* cited by examiner

*Primary Examiner*—Matthew D Anderson
*Assistant Examiner*—Minh D Dao
(74) *Attorney, Agent, or Firm*—Cesari and McKenna, LLP

(57) ABSTRACT

A wireless interoffice facility (IOF) is provided by a microwave network that overlays a public switched telephone network. The wireless IOF may be used by a carrier or other service provider to obtain needed bandwidth where the PSTN does not have sufficient capacity, the available capacity is too expensive, redundancy is needed or it is desirable to provide services that are alternative to or complementary with those provided by other common carriers. The wireless IOF may also be used to provide inter-LATA or interstate service without the need for an inter-exchange carrier.

9 Claims, 3 Drawing Sheets

METHOD AND APPARATUS FOR PROVIDING A WIRELESS INTEROFFICE FACILITY

BACKGROUND OF THE INVENTION

1. Field of the Invention

The present invention relates generally to the field of communications networks and, more specifically, to a microwave communication network which overlays a public switched telephone network and provides a wireless interoffice facility.

2. Background Information

The deregulation of the telecommunication service industry in the United States, along with an explosive increase in the use of the Internet, has led to the emergence of numerous new carriers and service providers who compete for customers desiring local phone service, long distance service, supplementary services (e.g., call waiting, voicemail, caller ID and the like) and Internet access. While the advent of such competition was both anticipated and desired by regulators, the resultant demands for access to and services from historical competitors have proved difficult to manage and, in some cases, overwhelming.

For example, the emergence of Digital Subscriber Line (DSL) service, popular for Internet access, has resulted in substantial demand on incumbent local exchange carriers (ILECs) to provide increased bandwidth between central offices and tandem switches to accommodate new DSL service providers. Similar demands for access or services may also be made by competitive local exchange carriers (CLECs) who are competing with ILECs.

Faced with ever increasing demands from other carriers and Internet service providers, at least some of whom are also competitors, ILECs are reluctant to make substantial new capital investments with uncertain prospects for return. In addition, in crowded, older metropolitan areas, creation of additional bandwidth in the public switched telephone network (PSTN) usually implies installation of new or additional fiber optic cable. However, installation of such additional cable is often cost prohibitive as it requires extensive capital investment not fitting the business model of the ILEC, particularly in situations where the additional capacity is being sought by a CLEC who, by definition, is competing with the ILEC.

What is needed is a cost effective, flexible, relatively easy to install system which provides needed bandwidth in commercially significant quantities and in a way that allows various types of carriers to obtain and use such bandwidth for whatever services they may choose.

SUMMARY OF THE INVENTION

In brief summary, the present invention provides a microwave communication network which overlays the PSTN and provides a wireless interoffice facility (IOF) between or among the central offices, tandem switches or other premises which are normally controlled by an ILEC. A plurality of microwave transceivers are geographically arranged so as to create wireless bandwidth where, for example, an ILEC has insufficient wireline bandwidth available, or where such wireless bandwidth may represent a better value, is desirable for redundancy, or simply provides service which is complementary to that of the ILEC or CLEC. Some or all of the microwave transceivers may be co-located with the ILEC's facilities, but such transceivers may be placed in other locations as appropriate.

The present invention provides wireless bandwidth in quantities that are equivalent to the speed of an OC-48 signal. The bandwidth is usable by CLECs, ISPs, interexchange carriers (IXCs), ILECs or other carriers or service providers who require bandwidth that may not be available or, if available, may be too expensive.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
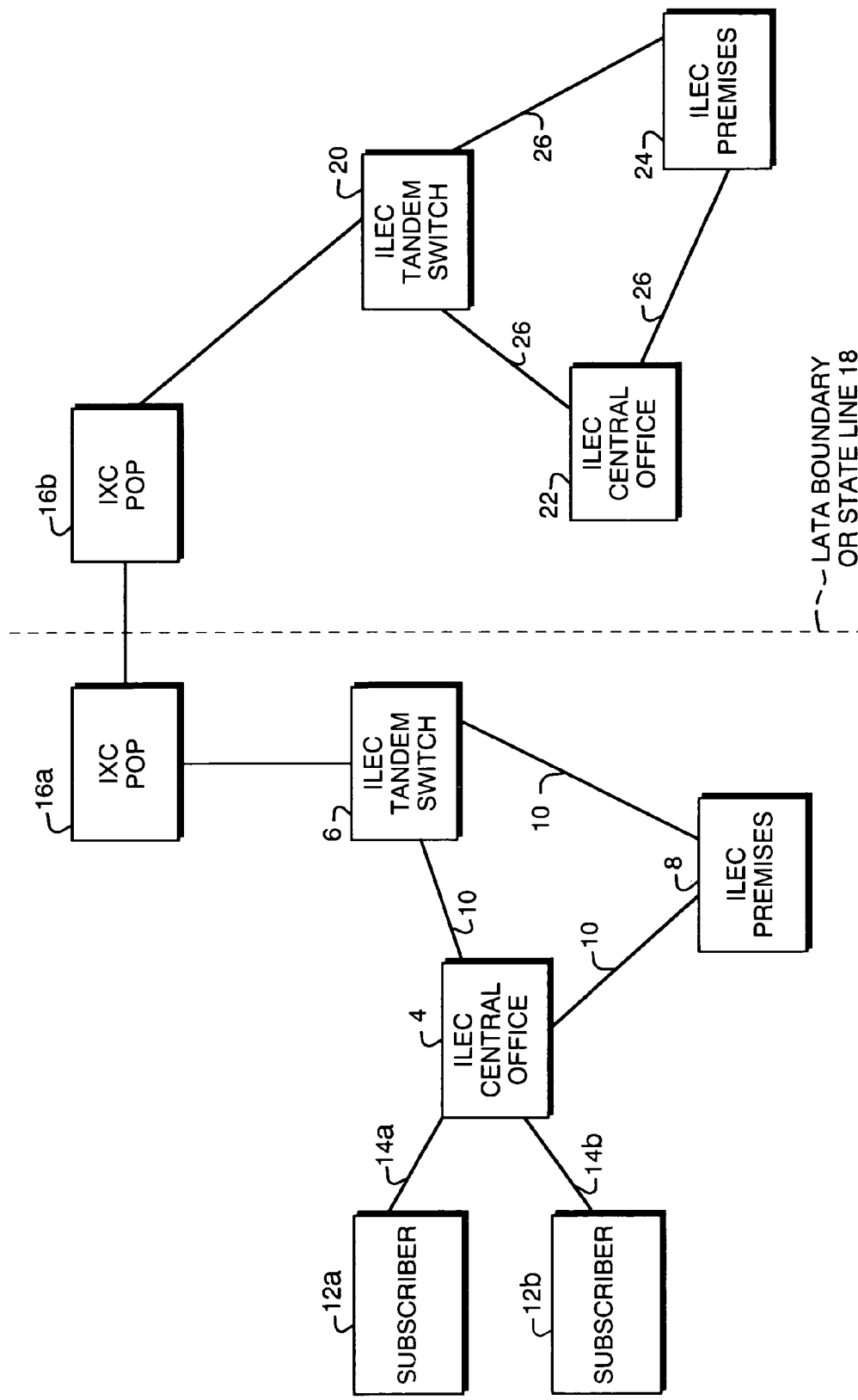
FIG. 1 is a diagram of a portion of a public switched telephone network known in the prior art.

FIG. 1 shows a portion of a public switched telephone network (PSTN) 2 known in the prior art. A central office 4, tandem switch 6 and other premises 8 which are owned by an ILEC are connected in communicating relationship by a synchronous optical network (SONET) ring 10. Those skilled in the art will understand that other types of wireline networks may be used to interconnect such facilities, but SONET is the widely used standard.

Subscribers 12a, 12b are connected in communicating relationship with central office 4 by lines 14a, 14b, respectively, which may represent simple analog phone lines, T1 spans or other types of circuits as may be ordered by the subscriber. An interexchange carrier (IXC) maintains two points of presence (POP) 16a, 16b on opposite sides of a local access and transport area (LATA) boundary or state line 18. POPs 16a, 16b serve to carry traffic bidirectionally between LATAs or across state lines in conformance with prevailing regulations. An ILEC owned tandem switch 20, central office 22 and other premises 24 are connected in communicating relationship via SONET ring 26.

SONET rings 10 and 26 are implemented with fiber optic cable which is typically installed in underground conduits or similar protective enclosures that extend among various buildings owned or controlled by the ILEC. Thus, should the traffic carried by SONET 10 ring approach the limit of its capacity, additional fiber optic cable and/or higher capacity SONET hardware must be installed among central office 4, tandem switch 6 and other premises 8 in order to increase capacity in a conventional manner.

Figure 2:
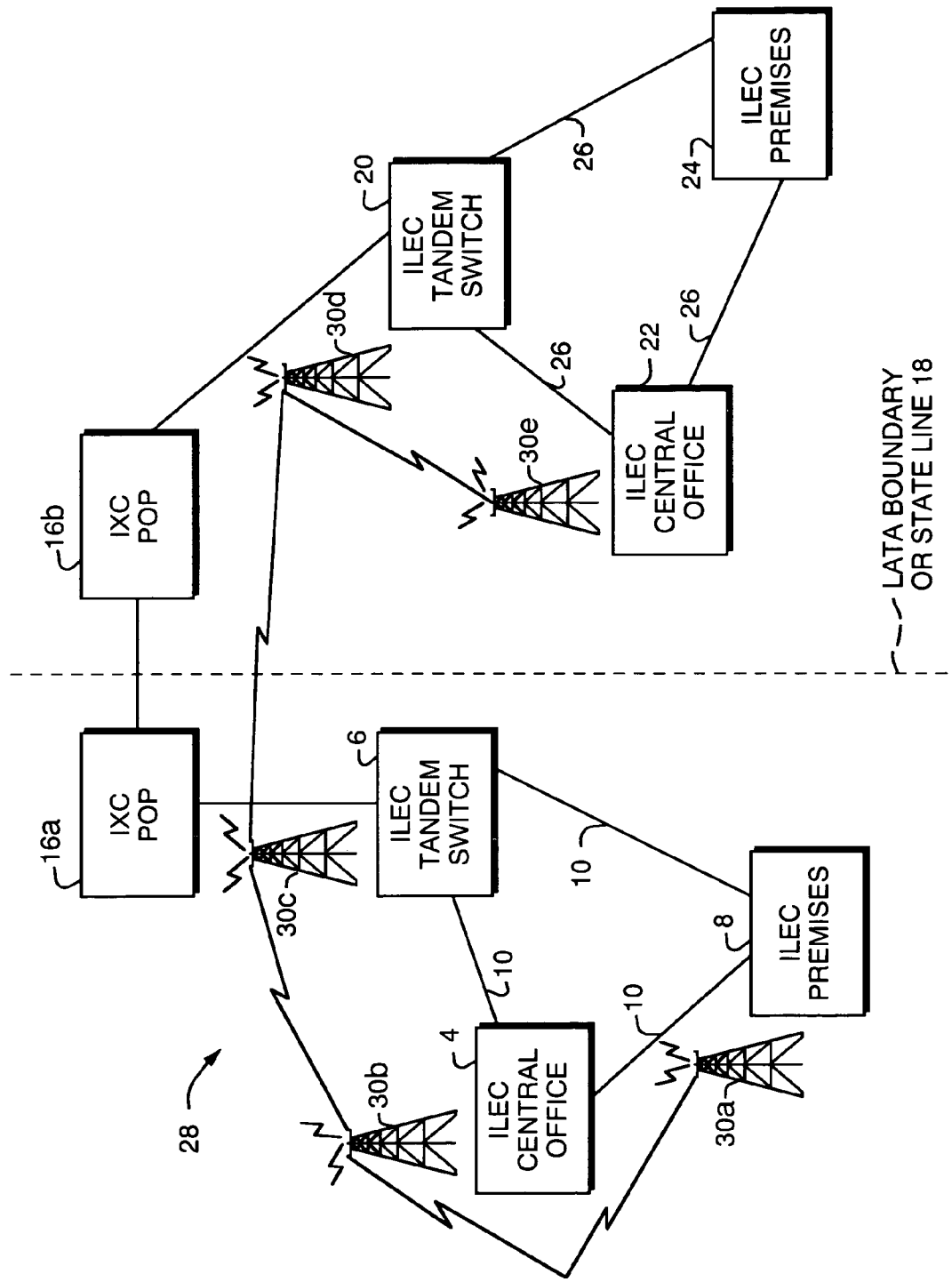
FIG. 2 is a diagram of microwave communication network, constructed in accordance with a preferred embodiment of the present invention, which overlays a PSTN and provides a wireless interoffice facility among facilities controlled by an ILEC.

FIG. 2 shows a wireless interoffice facility (IOF) 28, constructed in accordance with the present invention, which overlays a portion of the PSTN. Wireless IOF 28 functions to provide wireless bandwidth among an ILEC's central offices, tandem switches and other premises, as well between LATAs and across state lines. For clarity, common reference numbers are used for elements which were introduced previously.

Wireless IOF 28 is preferably implemented by a plurality of microwave transceivers 30a-30e. It will be understood by those skilled in the art that any number of transceivers that is greater than or equal to two could be used in constructing a wireless IOF that meets the requirements of a particular application. It will similarly be understood that each of transceivers 30a-30e is coupled to an appropriate antenna that may be mounted on a tower, rooftop or other structure depending on local topography.

In a preferred embodiment, microwave transceivers 30a-30e are of a commercially available type sold by NEC America (3000 series) and may be purchased separately or as part of a turnkey system. In an aggregation, transceivers 30a-30e are capable of reliably transmitting the equivalent capacity of an OC-48 circuit via sixteen (16) OC-3s. Thus, among central office 4, tandem switch 6, and premises 8, wireless IOF 28 provide wireless bandwidth which is equivalent to that obtainable from installing a traditional fiber optic network. It should be understood that other transmission speeds may also be used depending upon the requirements of a particular application and available technology.

The geographical locations of microwave transceivers 30a-30e are typically influenced by a variety of factors. For example, under prevailing regulations, it may be possible to co-locate one or more of transceivers 30a-30e within a central office, tandem switch or other ILEC premises. Such co-location may facilitate necessary connections between the transceivers and the PSTN, a private network or other third party equipment. On the other hand, topography or physical space limitations may suggest that one or more of transceivers 30a-30e should be located on premises owned or controlled by an ILEC, but not necessarily co-located with the ILEC's equipment. In addition to providing an alternative communication path to the PSTN for communications among an ILEC's facilities, wireless IOF 28, by virtue of microwave transceivers 30c and 30d, provides wireless bandwidth extending across LATA boundary/state line 18. Thus, the present invention advantageously enables inter-LATA or interstate service without the need for an IXC in addition to a local exchange carrier.

Figure 3:
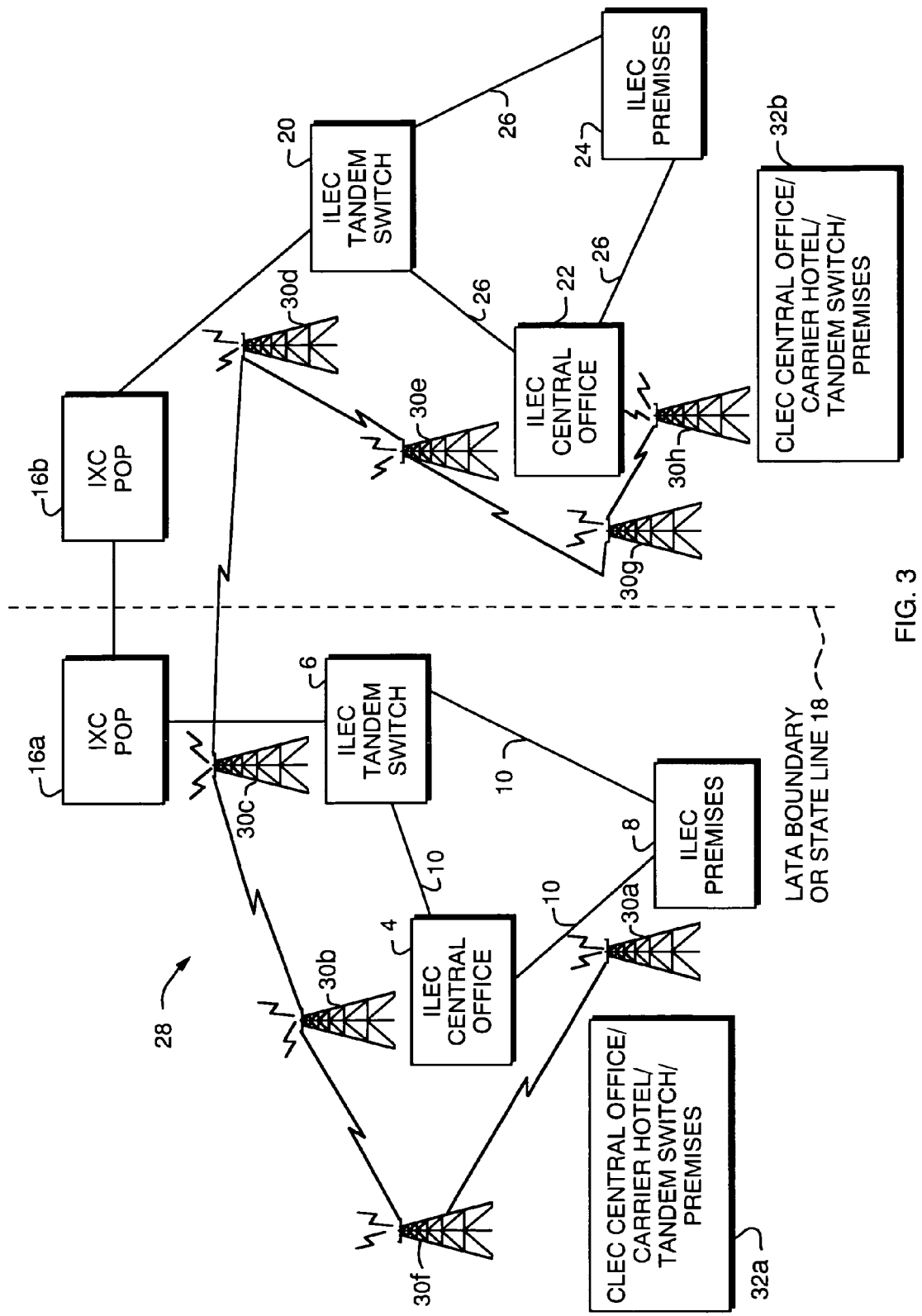
FIG. 3 is a diagram of an alternative embodiment of the present invention in which a wireless interoffice facility is provided between one or more facilities controlled by an ILEC and one or more facilities controlled by a common carrier other than the ILEC.

FIG. 3 shows an alternative embodiment of the present invention in which a wireless IOF is provided between one or more facilities controlled by an ILEC and one or more facilities controlled by a common carrier other than the ILEC. A microwave transceiver 30f, similar to transceivers to 30a-30e discussed above, is associated with a location 32a which may represent a CLEC central office, a carrier hotel, a tandem switch or other premises which are controlled by a common carrier other than the ILEC. It should be understood that location 32a could also represent other facilities or types of facilities controlled by a common carrier other than the ILEC. As a result, wireless IOF 28 is effectively extended between one or more facilities controlled by the ILEC (i.e., ILEC central office 4 and ILEC premises 8) and one or more facilities controlled by a common carrier other than the ILEC.

Also shown is a microwave transceiver 30g which may, for example, be located at a tower that is not associated with carrier facilities. Transceiver 30g, or others like it may be used to extend wireless IOF 28 to other common carrier premises 32b or to cover long distances between ILEC or common carrier facilities.

The foregoing description has been limited to specific embodiments of this invention. It will be apparent, however, that variations and modifications may be made to the invention, with the attainment of some or all of the advantages of the invention. Therefore, it is the object of the appended claims to cover all such variations and modifications as come within the true spirit and scope of the invention.

What is claimed is:

1. A microwave communication network that overlays a public switched telephone network (PSTN) comprising:
   a plurality of microwave transceivers forming a microwave network which overlays said public switched telephone network, said transceivers being geographically located so as to provide a wireless interoffice facility (IOF) for carrying all types of traffic normally carried by said PSTN between two or more central offices, tandem switches or other premises controlled by an incumbent local exchange carrier (ILEC), said wireless IOF being capable of providing an alternative communication path when said ILEC provides insufficient wireline bandwidth between two or more of said central offices, tandem switches or other premises.

2. The microwave communication network as in claim 1 wherein one or more of said microwave transceivers is located proximate to one or more of said central offices, tandem switches or other premises.

3. A method of providing wireless bandwidth in a microwave network which overlays a public switched telephone network (PSTN) comprising the steps of:
   (1) forming a microwave network from a plurality of microwave transceivers said microwave network overlaying said public switched telephone network;
   (2) geographically arranging said transceivers so as to provide wireless interoffice facility (IOF) for carrying all types of traffic normally carried by said PSTN between two or more central offices, tandem switches or other premises controlled by an incumbent local exchange carrier (ILEC), said wireless IOF being capable of providing an alternative communication path when said ILEC provides insufficient wireline bandwidth between two or more of said central offices, tandem switches or other premises, said wireless IOF being capable of providing an alternative communication path when said ILEC provides insufficient wireline bandwidth between two or more of said central offices, tandem switches or other premises.

4. A microwave communication network that overlays a public switched telephone network (PSTN) comprising:
   a plurality of microwave transceivers forming a microwave network which overlays said public switched telephone network, said transceivers being geographically located so as to provide a wireless interoffice facility (IOF) for carrying all types of traffic normally carried by said PSTN between one or more central offices, tandem switches or other premises controlled by an incumbent local exchange carrier (ILEC) and one or more central offices, tandem switches or other premises controlled by a common carrier other than said ILEC, said wireless IOF being capable of providing an alternative communication path when said ILEC provides insufficient wireline bandwidth between two or more of said central offices, tandem switches or other premises, said wireless IOF being capable of providing an alternative communication path when said ILEC provides insufficient wireline bandwidth between two or more of said central offices, tandem switches or other premises.

5. The microwave communication network as in claim 4 wherein one or more of said microwave transceivers is located proximate to one or more of said central offices, tandem switches or other premises.

6. A method of providing wireless bandwidth in a microwave network which overlays a public switched telephone network (PSTN) comprising the steps of:
   (1) forming a microwave network from a plurality of microwave transceivers, said microwave network overlaying said PSTN;

(2) geographically arranging said transceivers so as to provide wireless interoffice facility (IOF) for carrying all types of traffic normally carried by said PSTN between one or more central offices, tandem switches or other premises controlled by an incumbent local exchange carrier (ILEC) and one or more central offices, tandem switches or other premises controlled by a common carrier other than said ILEC, said wireless IOF being capable of providing an alternative communication path when said ILEC provides insufficient wireline bandwidth between two or more of said central offices, tandem switches or other premises.

7. A microwave communication network that overlays a public switched telephone network (PSTN) comprising:

a plurality of microwave transceivers forming a microwave network which overlays said PSTN, said transceivers being geographically located so as to provide a wireless interoffice facility (IOF) being capable of providing an alternative communication path to said PSTN for carrying all types of traffic normally carried by said PSTN between two or more central offices, tandem switches or other premises controlled by an incumbent local exchange carrier (ILEC), wherein said wireless IOF provides redundancy with respect to a failure of said wireline portion of said PSTN.

8. A microwave communication network that overlays a public switched telephone network (PSTN) comprising:

a plurality of microwave transceivers forming a microwave network which overlays said PSTN, said transceivers being geographically located so as to provide a wireless interoffice facility (IOF) being capable of providing an alternative communication path to said PSTN for carrying all types of traffic normally carried by said PSTN between two or more central offices, tandem switches or other premises controlled by an incumbent local exchange carrier (ILEC), wherein said wireless IOF provides wireless bandwidth more cost effectively than wireline bandwidth offered by said ILEC.

9. A microwave communication network that overlays a public switched telephone network (PSTN) comprising:

a plurality of microwave transceivers forming a microwave network which overlays said PSTN, said transceivers being geographically located so as to provide a wireless interoffice facility (IOF) being capable of providing an alternative communication path to said PSTN for carrying all types of traffic normally carried by said PSTN between two or more central offices, tandem switches or other premises controlled by an incumbent local exchange carrier (ILEC), wherein said wireless IOF provides service which is complementary to service provided by said wireline portion of said PSTN.

\* \* \* \* \*